UNITED STATES PATENT OFFICE.

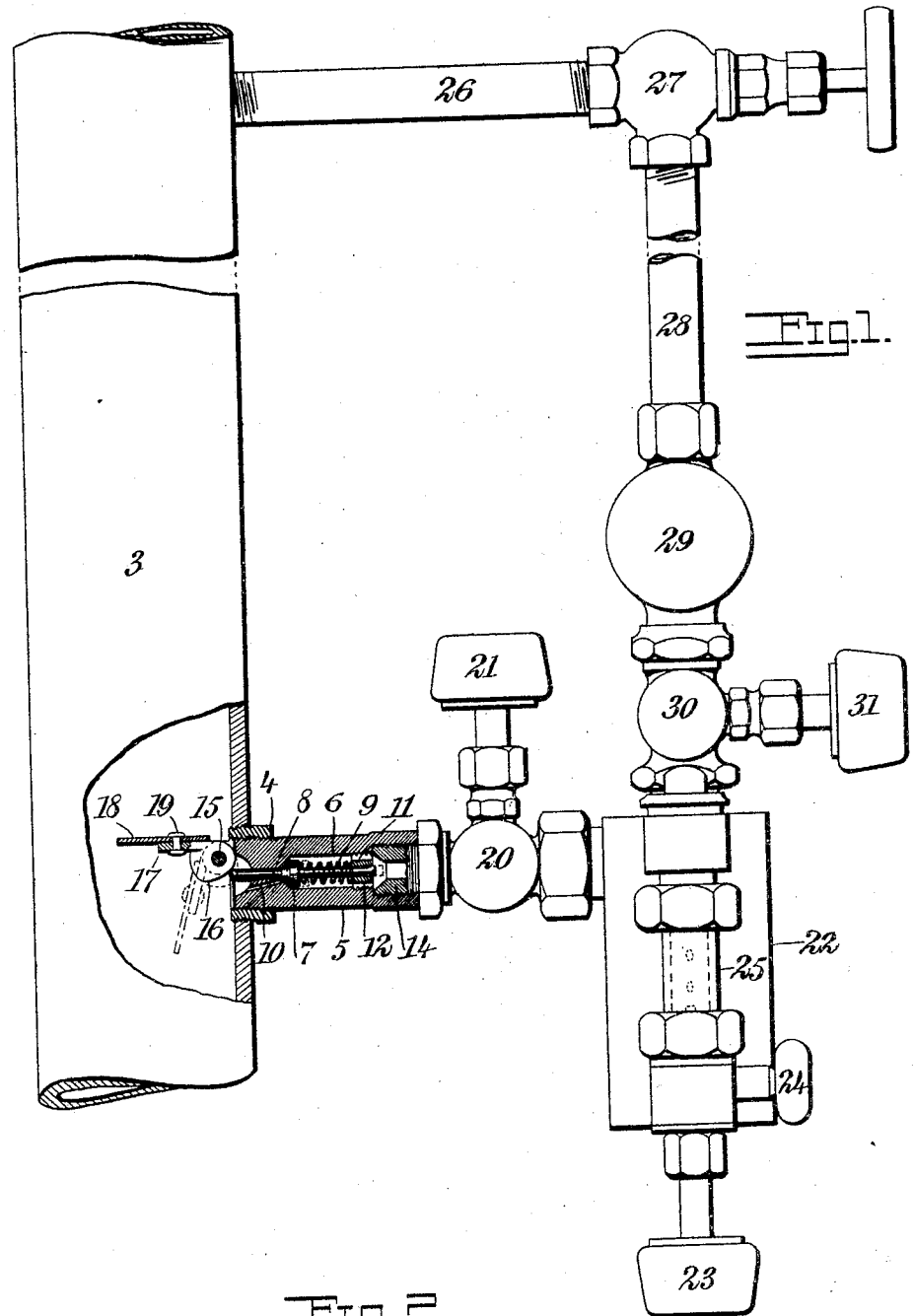

EDWARD A. HENRY AND ORLYN A. SNEED, OF JOPLIN, MISSOURI.

LUBRICATOR.

No. 796,511.     Specification of Letters Patent.     Patented Aug. 8, 1905.

Application filed December 14, 1904. Serial No. 236,884.

*To all whom it may concern:*

Be it known that we, EDWARD A. HENRY and ORLYN A. SNEED, citizens of the United States, and residents of Joplin, in the county of Jasper and State of Missouri, have invented a new and Improved Lubricator, of which the following is a full, clear, and exact description.

Our invention relates to lubricators and admits of general use, but is of peculiar service upon steam-engines and analogous motors in which it is desired that the feed of the lubricant shall have a relation to the flow of steam or of some other aeriform body.

Reference is to be had to the accompanying drawings, forming a part of this specification, in which similar characters of reference indicate corresponding parts in both the figures.

Figure 1 is a side elevation of our device and the connections used therewith, and Fig. 2 is a front elevation of the spider 11 removed from the valve-casing.

The steam-line is shown at 3 and preferably leads downward to the member to be lubricated—for instance, a steam-cylinder. Fitted steam-tight into the steam-line 3 is a bushing 4, which encircles and holds in position a cylindrical member 5, provided with a cylindrical passage 6 coaxial therewith. A valve 7 is seated at one end of the passage 6 and is provided with a stem 8, loosely encircled by a spiral compression-spring 9. A duct 10 leads obliquely downward from the passage 6. A spider 11 is mounted within the passage 6 and is provided with passages 12 communicating with the passage 6. The spider 11 is also provided with a central slideway 13, which is engaged by the slidable valve-stem 8. A neck 14, constituting a part of a globe-valve 20, engages the casing 5 and serves to hold the spider 11 in position, the casing 5 being threaded for the purpose. The spider 11 and the neck 14 are severally threaded and screwed into the cylindrical casing 5. Mounted upon a pivot 15 is a cam 16, having a plate 17 integral therewith. This plate carries a door 18, secured upon it by means of a rivet 19. The globe-valve 20 is controllable by means of a hand-wheel 21.

The lubricant-reservoir is shown at 22 and is provided with handles 23 24 and with a displacement-tube 25, these parts being of the usual construction. The steam connections for the lubricator consist of the pipe 26, globe-valve 27, pipe 28, condensing-chamber 29, valve 30, and handle 31, these parts being preferably of ordinary construction.

The normal position of the parts when steam is not passing through the steam-line 3 is indicated by full lines in Fig. 1. When, however, steam is caused to flow through the steam-line 3, it impinges against the door 18, which is thereupon bent downward, as indicated by dotted lines in Fig. 1. The momentum of the steam-jet passing through the steam-line governs the degree of angular movement executed by the door 18, and consequently governs the position assumed by the cam 16 and the valve-stem 8. The result is that the duct 10 is opened to a greater or lesser extent by the displacement of the valve 7 as the latter moves back so as to compress the spring 9. When the duct 10 is open, the lubricant can flow from the passage 6 through the duct 10 into the steam-line 3 and thence conveyed to the point where it may be needed. When, however, the flow of steam through the steam-line ceases, the pressure of the spring 9 seats the valve 7, closes the duct 10, and thus stops the further flow of the lubricant.

Having thus described our invention, we claim as new and desire to secure by Letters Patent—

1. In a lubricator, the combination of a normally closed valve for feeding a lubricant, a door connected with said valve, and means for causing an aeriform body to impinge upon said door so as to open said valve.

2. In a lubricator, the combination of a movable member, means for directing upon the same a moving jet of an aeriform body, a valve connected with said member and adapted to be opened by movements thereof, and means for feeding a lubricant to said valve.

3. The combination of a steam-line, a door hinged therein and adapted to move by the impact of a steam-current thereupon, a cam connected with said door, a cylindrical member disposed adjacent to said cam and provided with a valve-seat and with a duct adjacent to said valve-seat, a valve member mounted within said cylindrical member and adapted to close said duct, means for normally retaining said valve in a predetermined position, and means for feeding a lubricant into said cylindrical member.

4. The combination of a spring-controlled valve for controlling the flow of a lubricant, a cam adapted to engage said valve so as to unseat the same, and a member controllable by a moving mass of an aeriform body for shifting the position of said door.

In testimony whereof we have signed our names to this specification in the presence of two subscribing witnesses.

EDWARD A. HENRY.
ORLYN A. SNEED.

Witnesses:
G. PHILIPP DIETER,
CONRAD A. WENZEL.